UNITED STATES PATENT OFFICE.

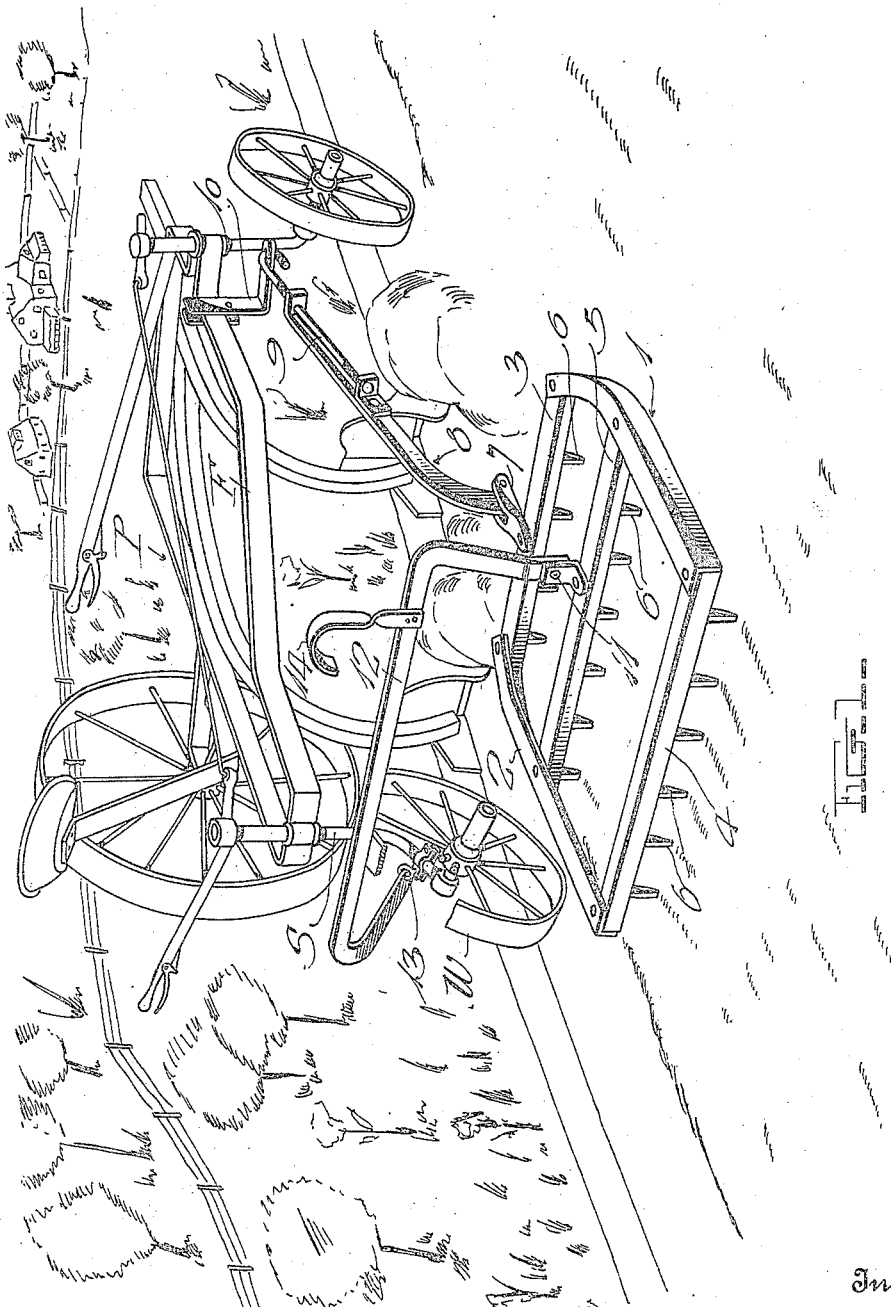

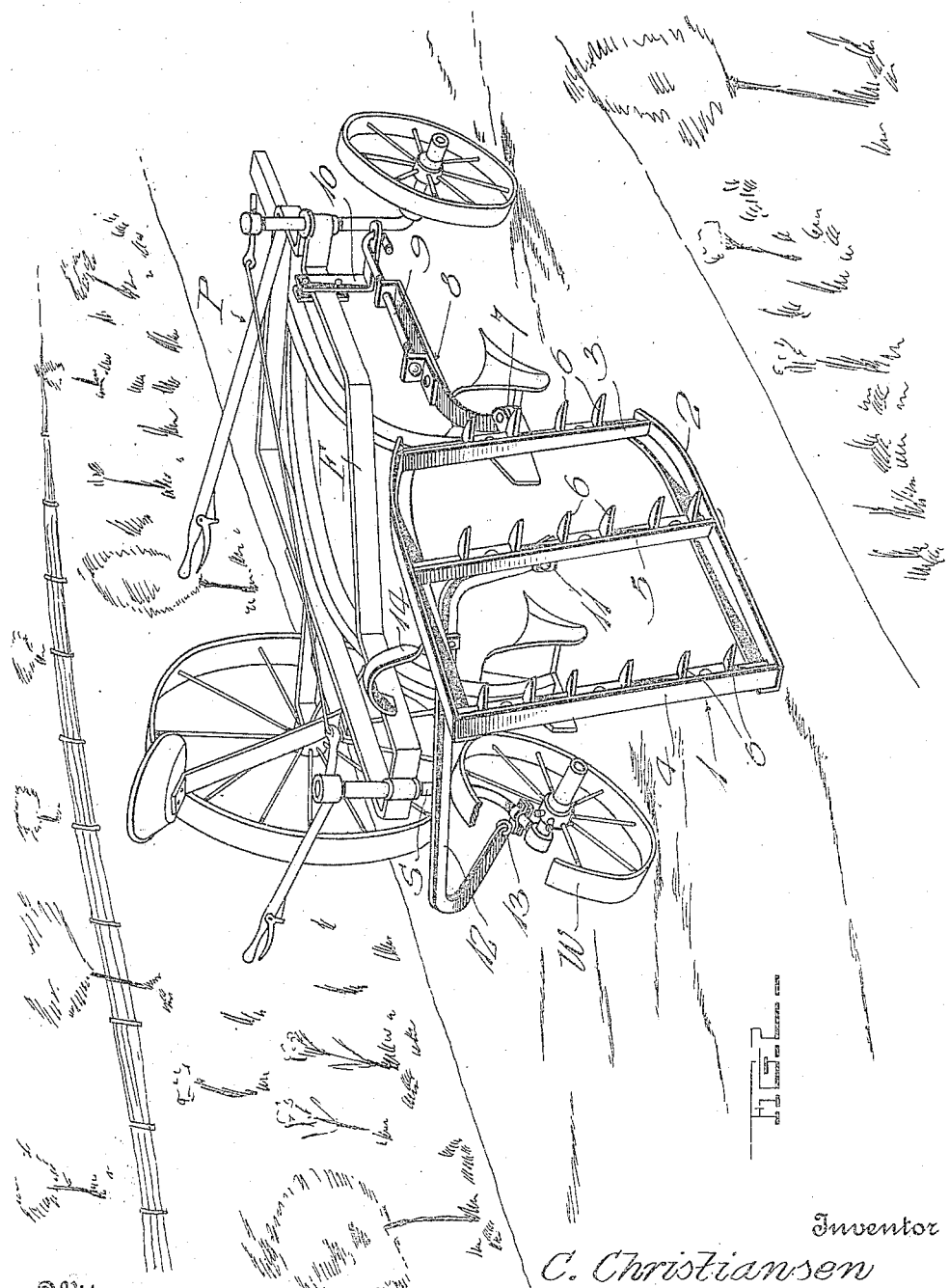

CHRISTIAN CHRISTIANSEN, OF SIOUX FALLS, SOUTH DAKOTA.

HARROW ATTACHMENT.

1,294,235.

Specification of Letters Patent.   Patented Feb. 11, 1919.

Application filed July 20, 1918.   Serial No. 245,846.

*To all whom it may concern:*

Be it known that I, CHRISTIAN CHRISTIANSEN, a citizen of the United States, residing at Sioux Falls, in the county of Minnehaha and State of South Dakota, have invented certain new and useful Improvements in Harrow Attachments; and I do declare the following to be a full, clear, and exact description of the invention, such as will enable others skilled in the art to which it appertains to make and use the same.

My invention relates to improvements in harrow attachments for gang or sulky plows and other agricultural implements, and has for its principal object to provide an attachment of this class which will be simple and inexpensive to manufacture, efficient and durable in use, and readily portable with the plow over unplowed ground or along roadways.

With the foregoing object in view, the invention resides in the novel features of construction and unique combinations of parts to be hereinafter fully described and claimed, the descriptive matter being supplemented by the accompanying drawings which form a part of this specification and in which:

Figure 1 is a perspective view of the invention and a portion of a plow, showing the harrow in operative position; and Fig. 2 is a view similar to Fig. 1 but illustrating the manner in which the harrow may be turned on edge to be drawn along the ground.

In the drawings above briefly described, a portion of a wheeled plow P is shown, said plow including a frame F, a rear wheel W instrumental in steering, and a rear standard S having a rearwardly directed lower end upon which said wheel is mounted, all of these being well known features of construction forming no part of the present invention.

The improved harrow is designated by the numeral 1 and one of its side bars 2 is shaped in the form of a runner to travel along the ground as seen in Fig. 2 when the device is not in operation. Both side bars of the harrow are preferably of the same shape for ease in manufacture, but only one comes into play as a runner. A front bar 3, a rear bar 4, and a central bar 5 connect the two side bars 2 and carry the harrow teeth 6 which are preferably of the design shown.

At 7, the rear end of a longitudinal draft member 8 is connected to the center of the front bar 3 for both vertical and horizontal swinging, the front end of said draft member having a rod 9 swiveled thereto and loosely connected at its front end to a bracket 10 clamped or otherwise secured to the frame F. At 11, the outer end of a transverse spacing bar 12 is connected off center to the central bar 5 for both vertical and horizontal swinging, and at 13 the inner end of bar 12 is loosely connected with the rearwardly directed lower end standard S or with any other preferred part of the plow. The bar in question is preferably arched as shown with its inner end offset forwardly to a slight extent and with its outer end similarly offset to the rear. By connecting bar 12 with the standard S as shown, turning of said standard for the usual purposes, will shift the harrow to retain it in proper relation with the earth turned by the plows.

By connecting the draft member and the spacing bar to the harrow as shown, the latter is permitted to float or swing horizontally and vertically as irregularities in the ground are encountered and when turning, so that the best results will be obtained without placing undue strain on the plow or other implement with which the attachment is used.

A curved handle 14 is secured to the outer end of and rises from the spacing bar 12 for raising this bar and the harrow when the latter is to be disposed on edge as seen in Fig. 2, the then uppermost side bar of the harrow frame resting against said handle and holding the entire harrow in an inclined position, though substantially vertical, to be pulled along from one field to another or along a roadway. The swivel connection of the rod 9 with the draft member 8 and the longitudinal pivot of the connection 9, permit the harrow to swing vertically in the required manner. On account of the off-center location of the connection 11, such connection being nearer to the outer edge of the harrow than to the inner edge thereof, raising of the bar 12 will cause gravity to act upon the harrow in such a manner as to swing it to the position of Fig. 2. The harrow frame is of exceptionally light construction and by means of the handle, the spacing bar 12 may be raised with ease from the driver's seat to lift said frame to the required extent.

From the foregoing, taken in connection with the accompanying drawings, it will be obvious that although my invention is of extremely simple and inexpensive nature, it will be highly efficient and in every way desirable. Since probably the best results are obtained from the several details shown and described, they are preferably followed, but within the scope of the invention as claimed, considerable latitude is allowed.

I claim:—

1. In an attachment for agricultural implements, a harrow, a draft member extending forwardly from said harrow and having means for connecting it to the implement, a transverse spacing bar pivotally connected to said harrow and extending laterally therefrom, the connection between said spacing bar and harrow being offset from but adjacent to the longitudinal center of gravity of said harrow, whereby raising of said spacing bar will cause gravity to dispose said harrow vertically, and means for pivotally connecting said spacing bar to the implement, said harrow having a runner upon which it may rest on edge.

2. A structure as specified in claim 1, said harrow being connected to said draft member and spacing bar for both vertical and horizontal swinging.

3. In combination with a portable implement frame having a rear tractor wheel instrumental in steering and a vertical standard having a rearwardly directed lower end on which said wheel is mounted, a harrow spaced laterally from said wheel, a transverse spacing bar having one leg pivotally connected with said rearwardly directed end of said standard, the other end of said bar being connected pivotally to the harrow, and a draft member connecting said harrow with the implement frame.

In testimony whereof I have hereunto set my hand.

CHRISTIAN CHRISTIANSEN.

Witnesses:
HAROLD G. LEDYARD,
RUTH LEDYARD.

Copies of this patent may be obtained for five cents each, by addressing the "Commissioner of Patents, Washington, D. C."